United States Patent
Hu et al.

(10) Patent No.: US 11,050,363 B2
(45) Date of Patent: Jun. 29, 2021

(54) FRICTIONAL ELECTRIC GENERATOR, DEVICE INCLUDING THE SAME, AND METHOD FOR MANUFACTURING THE SAME

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Haifeng Hu, Beijing (CN); Liuyue Yin, Beijing (CN); Zhanqi Xu, Beijing (CN); Weijie Ma, Beijing (CN); Zhi Du, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 294 days.

(21) Appl. No.: 16/083,199

(22) PCT Filed: Feb. 1, 2018

(86) PCT No.: PCT/CN2018/074914
§ 371 (c)(1),
(2) Date: Sep. 7, 2018

(87) PCT Pub. No.: WO2019/015300
PCT Pub. Date: Jan. 24, 2019

(65) Prior Publication Data
US 2020/0304041 A1    Sep. 24, 2020

(30) Foreign Application Priority Data
Jul. 20, 2017 (CN) .......................... 201710595400.5

(51) Int. Cl.
*H02N 1/04* (2006.01)
*C08L 83/04* (2006.01)
(Continued)

(52) U.S. Cl.
CPC ............... *H02N 1/04* (2013.01); *C08G 77/04* (2013.01); *C08L 83/04* (2013.01); *C09D 183/04* (2013.01)

(58) Field of Classification Search
CPC ......... H02N 1/04; C08L 83/04; C09D 183/04; C08G 77/04
(Continued)

(56) References Cited

U.S. PATENT DOCUMENTS

| 7,719,167 B2* | 5/2010 | Kwon | ................. H01L 41/0471 310/328 |
| 8,193,655 B2* | 6/2012 | Roberts | ................... H01L 41/22 290/53 |

(Continued)

FOREIGN PATENT DOCUMENTS

| CN | 103532425 A | 1/2014 |
| CN | 104348379 A | 2/2015 |

(Continued)

OTHER PUBLICATIONS

Minjeong Ha et al, "Triboelectric Generators and Sensors for Self-Powered Wearable Electronics", American Chemical Society, Mar. 19, 2015.*

(Continued)

*Primary Examiner* — John K Kim
(74) *Attorney, Agent, or Firm* — Brooks Kushman P.C.

(57) ABSTRACT

A frictional electric generator, a device including the frictional electric generator, and a method for manufacturing the frictional electric generator are provided. The frictional electric generator includes a first frictional unit and a second (Continued)

frictional unit arranged opposite to each other. The first frictional unit includes a first output electrode, and the second frictional unit includes a second output electrode. A composite layer is arranged in at least one of the first frictional unit or the second frictional unit, and is provided with a surface having concave-convex nanostructures as a frictional surface. The first output electrode and the second output electrode are configured to form a capacitor.

12 Claims, 2 Drawing Sheets

(51) Int. Cl.
  *C08G 77/04* (2006.01)
  *C09D 183/04* (2006.01)
(58) Field of Classification Search
  USPC .................................................. 310/309, 310
  See application file for complete search history.

(56) References Cited

U.S. PATENT DOCUMENTS

| | | | | |
|---|---|---|---|---|
| 9,876,443 | B2* | 1/2018 | Bae | H02N 1/04 |
| 2013/0049531 | A1* | 2/2013 | Wang | H02N 1/04 |
| | | | | 310/309 |
| 2014/0246951 | A1* | 9/2014 | Wang | H02N 1/04 |
| | | | | 310/310 |
| 2014/0338458 | A1* | 11/2014 | Wang | G01H 11/06 |
| | | | | 73/658 |
| 2015/0061459 | A1* | 3/2015 | Kwon | H02N 1/08 |
| | | | | 310/309 |
| 2015/0061460 | A1* | 3/2015 | Bae | H02N 1/04 |
| | | | | 310/310 |
| 2015/0214860 | A1* | 7/2015 | Tanaka | H02N 1/002 |
| | | | | 310/309 |
| 2015/0236619 | A1* | 8/2015 | Hattori | H02M 7/08 |
| | | | | 310/309 |
| 2015/0318800 | A1* | 11/2015 | Zhang | H02N 1/04 |
| | | | | 310/310 |
| 2016/0036351 | A1* | 2/2016 | Kim | H02N 1/04 |
| | | | | 73/514.32 |
| 2016/0164434 | A1* | 6/2016 | Kim | H02N 2/18 |
| | | | | 310/310 |
| 2017/0237365 | A1* | 8/2017 | Kwon | A41D 1/002 |
| | | | | 310/310 |
| 2018/0091065 | A1* | 3/2018 | Bae | H02N 1/04 |
| 2018/0160911 | A1* | 6/2018 | Fu | A61B 5/0205 |
| 2020/0304041 | A1* | 9/2020 | Hu | C08L 83/04 |

FOREIGN PATENT DOCUMENTS

| | | |
|---|---|---|
| CN | 104779832 A | 7/2015 |
| CN | 105553324 A | 5/2016 |
| CN | 107196551 A | 9/2017 |

OTHER PUBLICATIONS

International Search Report and Written Opinion for Application No. PCT/CN2018/074914, dated Apr. 27, 2018, 12 Pages.

* cited by examiner

FRICTIONAL ELECTRIC GENERATOR, DEVICE INCLUDING THE SAME, AND METHOD FOR MANUFACTURING THE SAME

CROSS-REFERENCE TO RELATED APPLICATIONS

This application is the U.S. national phase of PCT Application No. PCT/CN2018/074914 filed on Feb. 1, 2018, which claims priority to Chinese Patent Application No. 201710595400.5 filed on Jul. 20, 2017, which are incorporated herein by reference in their entireties.

TECHNICAL FIELD

The present disclosure relates to the field of frictional electric generation technology, and in particular to a frictional electric generator, a pressure sensor, a touch substrate, a touch device, a flexible wearable device and a method for manufacturing a frictional electric generator.

BACKGROUND

Energy crisis have attracted more and more attentions. Green energy resources, such as solar energy, hydrogen energy, wind energy, heat energy and mechanical vibration energy, have also attracted more and more attentions and have become a focus of research. As a new structure, which is pollution-free, stable, simple and easily-implemented, a frictional electric generator has gained increasing attention, especially a flexible frictional electric generator has been studied and widely applied, such as being applied to a self-powered pressure sensor.

Currently, a frictional electrode of the flexible frictional electric generator is mainly made of indium tin oxide (ITO) or graphene. For the ITO electrode, although with a relatively low sheet resistance in a planar state, its resistance may increase dramatically in a bent state due to poor flexibility, so energy outputted in the bent state may decrease dramatically. For the graphene electrode, due to its excellent flexibility, its sheet resistance may not change significantly in the bent state. However, the sheet resistance of the graphene electrode is greater than, by orders of magnitude, the sheet resistance of the ITO electrode in a non-bent state. Thus, as compared with the ITO electrode, its energy output efficiency is relatively low.

Hence, it is a challenge to provide a flexible frictional electric generator having high energy output efficiency.

SUMMARY

In view of the above, the present disclosure provides a frictional electric generator, a device including the frictional electric generator and a method for manufacturing the frictional electric generator.

The present disclosure provides a frictional electric generator, including a first frictional unit and a second frictional unit arranged opposite to each other. The first frictional unit includes a first output electrode, and the second frictional unit includes a second output electrode. A composite layer is arranged in at least one of the first frictional unit or the second frictional unit, and the composite layer is provided with a surface having concave-convex nanostructures as a frictional surface. The first output electrode and the second output electrode are configured to form a capacitor.

Optionally, the composite layer in one of the first frictional unit and the second frictional unit includes, in a direction facing the other of the first frictional unit and the second frictional unit, a first insulation layer, at least one conductive layer and a second insulation layer in sequence. A surface of the second insulation layer facing the other of the first frictional unit and the second frictional unit has the concave-convex nanostructures and serves as the frictional surface, and the conductive layer is configured to form a capacitor with at least one of the first output electrode or the second output electrode.

Optionally, the second insulation layer is of a concave-convex structure having a nanoscale thickness.

Optionally, the conductive layer is a conductive polymer layer, and/or each of the first insulation layer and the second insulation layer is made of insulation polymer material.

Optionally, the first insulation layer a polydimethylsiloxane (PDMS) layer, the conductive layer is a poly 3,4-ethylenedioxythiophene (PEDOT) layer, and the second insulation layer is a parylene layer.

Optionally, an orthogonal projection of a convex point on the frictional surface of the first frictional unit onto the frictional surface overlaps an orthogonal projection of a convex point on the frictional surface of the second frictional unit onto the frictional surface.

Optionally, the composite layer of the first frictional unit and the composite layer of the second frictional unit are mirror symmetric relative to a plane which is between the frictional surface of the first frictional unit and the frictional surface of the second frictional unit and is parallel to the frictional surfaces.

Optionally, the frictional surface is provided with multiple convex points arranged in an array form, and each of the multiple convex points has at least one of a nanoscale height or a nanoscale diameter.

Optionally, at least one of the first output electrode or the second output electrode is made of flexible conductive material.

Optionally, the flexible conductive material is graphene or carbon nanotube.

Optionally, the first frictional unit includes, in a direction facing the second frictional unit, a first insulation substrate, the first output electrode and the composite layer in sequence, the first insulation substrate is made of polyethylene terephthalate (PET), and the first output electrode is made of graphene. The second frictional unit includes a second insulation substrate and the second output electrode, the second output electrode is arranged at a side of the second insulation substrate away from the first frictional unit, the second insulation substrate is made of PET, and the second output electrode is made of indium tin oxide (ITO).

Optionally, the first frictional unit includes, in a direction facing the second frictional unit, a first insulation substrate, the first output electrode, and the composite layer in sequence. The first insulation substrate is made of PET, and the first output electrode is made of graphene. The second frictional unit includes the second output electrode and the composite layer arranged at a side of the second output electrode facing the first frictional unit, and the second output electrode is made of ITO.

The present disclosure further provides a pressure sensor including the above-mentioned frictional electric generator. The first output electrode of the frictional electric generator is reused as a movable electrode of the pressure sensor, the second output electrode is reused as a fixed electrode of the pressure sensor, and the first output electrode is made of flexible conductive material.

The present disclosure further provides a touch substrate including the above-mentioned pressure sensor.

The present disclosure further provides a touch device including the above-mentioned touch substrate, and a control unit connected to the touch substrate and configured to receive a current from the pressure sensor and perform touch control based on a size of the current.

The present disclosure further provides a flexible wearable device including the above-mentioned pressure sensor. At least one of the first output electrode or the second output electrode is made of flexible conductive material.

The present disclosure further provides a method for manufacturing a frictional electric generator, including forming a first frictional unit and a second frictional unit arranged opposite to each other, where the first frictional unit includes a first output electrode, the second frictional unit includes a second output electrode, a composite layer is formed in at least one of the first frictional unit or the second frictional unit, the composite layer is provided with a surface having concave-convex nanostructures as a frictional surface, and the first output electrode and the second output electrode are configured to form a capacitor.

Optionally, the forming the composite layer includes: providing a template, a surface of the template being provided with multiple nanoscale holes; forming a first insulation layer on the surface of the template; removing the first insulation layer from the template, where a surface of the first insulation layer has concave-convex nanostructures; and forming at least one conductive layer and a second insulation layer sequentially on the surface of the first insulation layer having the concave-convex nanostructures, where the composite layer includes the first insulation layer, the at least one conductive layer and the second insulation layer.

Optionally, the forming the first frictional unit includes: providing a copper foil, and depositing a single layer of graphene on the copper foil to form the first output electrode; etching away the copper foil through a wet-etching process to reserve the first output electrode, and transferring the first output electrode to a first insulation substrate made of PET; and attaching the composite layer to a surface of the first output electrode to form the first frictional unit; and the forming the second frictional unit includes: providing a second insulation substrate made of PET; and plating an ITO film onto the second insulation substrate to form the second output electrode, where the second frictional unit includes the second insulation substrate and the second output electrode.

Optionally, the forming the first frictional unit includes: providing a copper foil, and depositing a single layer of graphene on the copper foil to form the first output electrode; etching away the copper foil through a wet-etching process to reserve the first output electrode, and transferring the first output electrode to a first insulation substrate made of PET; and attaching one formed composite layer to a surface of the first output electrode to form the first frictional unit; and where the forming the second frictional unit includes plating an ITO film onto a surface of another formed composite layer not having the concave-convex nanostructures, to form the second output electrode, where the second frictional unit includes the another composite layer and the second output electrode.

BRIEF DESCRIPTION OF THE DRAWINGS

In order to illustrate the technical solutions of embodiments of the present disclosure in a clearer manner, the drawings used in descriptions of the embodiments of the present disclosure will be described hereinafter briefly. Apparently, the drawings merely illustrate some embodiments of the present disclosure, and based on these drawings, a person skilled in the art may obtain other drawings without any creative effort.

DETAILED DESCRIPTION

Figure 1:
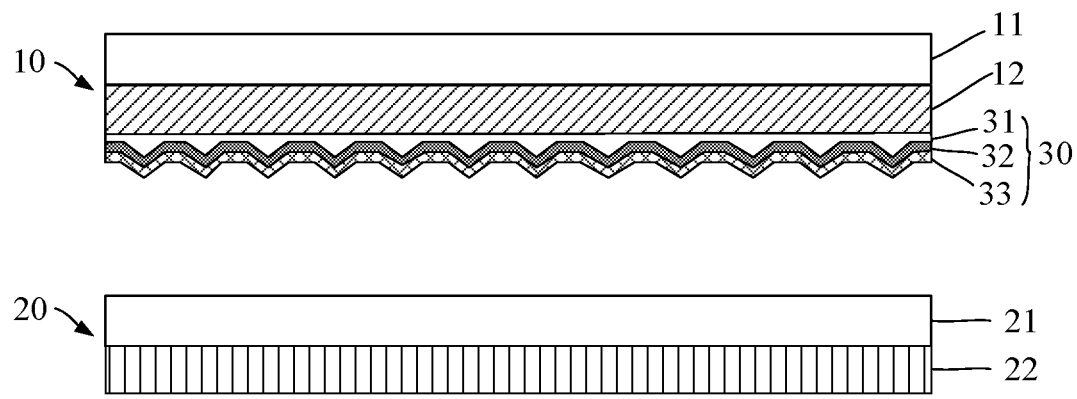
FIG. 1 is a schematic view showing a frictional electric generator according to a first embodiment of the present disclosure.

In order to make the objects, the technical solutions and the advantages of the present disclosure clearer, the technical solutions in embodiments of the present disclosure will be described hereinafter in a clear and complete manner in conjunction with the drawings of embodiments of the present disclosure. Apparently, the embodiments described herein are merely a part of, rather than all of, the embodiments of the present disclosure. All other embodiments obtained based on the embodiments of the present disclosure by those skilled in the art without any creative efforts fall within the protection scope of the present disclosure.

In order to solve the problem in the conventional technology where a frictional electric generator has low energy output efficiency, the present disclosure provides in some embodiments a frictional electric generator, including a first frictional unit and a second frictional unit arranged opposite to each other. The first frictional unit includes a first output electrode, and the second frictional unit includes a second output electrode. A composite layer is arranged in at least one of the first frictional unit or the second frictional unit, and is provided with a surface having concave-convex nanostructures. The composite layer includes at least three layers. Among the at least three layers, two layers at both sides are insulation layers, and at least one of layers between the two insulation layers is a conductive layer.

Optionally, nanoscale concaves and convexes are formed at a surface of one frictional unit facing the other frictional unit (which may serve as a frictional surface in an embodiment), or nanoscale concaves and convexes are formed at two opposite surfaces of the two frictional units.

Optionally, the composite layer of one frictional unit may include, in a direction facing the other frictional unit, a first insulation layer, the at least one conductive layer and a second insulation layer in sequence. Nanoscale concaves and convexes are formed at a surface of the second insulation layer. For example, in a direction perpendicular to the frictional surface, a distance between a convex and an adjacent concave is at a nanoscale, and/or each convex has a nanoscale diameter. In some embodiment, the second insulation layer may have a concave-convex structure and may have a nanoscale thickness. Optionally, the conductive layer may have a same concave-convex structure as the second insulation layer.

According to the embodiments of the present disclosure, the composite layer with the surface having the concave-convex nanostructures is formed in at least one frictional unit of the frictional electric generator and serves as a frictional layer. In this way, roughness of the frictional surface of the frictional unit is increased, and a charge transfer density of the frictional electric generator is increased, thereby increasing the energy output efficiency of the frictional electric generator. In addition, since the composite layer includes the conductive layer, and the conductive layer is capable of forming a capacitor with the output electrode, it is able to improve the sensitivity of a pressure sensor when the frictional electric generator is applied to the capacitive pressure sensor.

An operating principle of the capacitive pressure sensor is as follows. When a distance between a movable electrode and a fixed electrode changes, a capacitance between the two electrodes may change. When the pressure sensor is provided with an additional capacitor, it is able to improve the sensitivity of the pressure sensor.

In some possible embodiments of the present disclosure, a surface of the composite layer is provided with multiple nanoscale convex points, so as to form concave-convex nanostructures.

Optionally, the multiple convex points are arranged in a matrix form. Optionally, each convex point may be of a semicircular, nearly-semicircular, conical or drop-like shape.

In an embodiment of the present disclosure, the first frictional unit may further include a first insulation substrate configured to carry the first output electrode, and/or the second frictional unit may further include a second insulation substrate configured to carry the second output electrode. When the frictional electric generator according to the embodiment of the present disclosure is applied to a flexible product, at least one of the first insulation substrate or the second insulation substrate may be made of flexible insulation material, e.g., PET (polyethylene terephthalate).

Referring to FIG. 1 which shows a frictional electric generator according to a first embodiment of the present disclosure, the frictional electric generator includes a first frictional unit 10 and a second frictional unit 20 arranged opposite to each other. The first frictional unit 10 includes a first insulation substrate 11, a first output electrode 12 and a composite layer 30. The second frictional unit 20 includes a second insulation substrate 21 and a second output electrode 22. The composite layer 30 is provided with a surface having concave-convex nanostructures, and includes three layers, i.e., a first insulation layer 31, a conductive layer 32 and a second insulation layer 33. In an embodiment of the present disclosure, the first output electrode 12 and the second output electrode 22 may serve as two output electrodes of the frictional electric generator. The composite layer 30 and the second insulation substrate 21 may serve as two frictional layers of the frictional electric generator, and they may be in contact with each other to generate electricity from friction during frictional electric generation.

According to the embodiments of the present disclosure, the composite layer 30 with the surface having the concave-convex nanostructures is formed in the first frictional unit 10 and serves as a frictional layer. In this way, roughness of the frictional surface of the first frictional unit 10 is increased, and a charge transfer density of the frictional electric generator is increased, thereby increasing the energy output efficiency of the frictional electric generator. In addition, since the composite layer 30 includes the conductive layer (e.g., the conductive layer 32), and the conductive layer is capable of forming a capacitor with the first output electrode 12, it is able to improve the sensitivity of a pressure sensor when the frictional electric generator is applied to a capacitive pressure sensor.

Figure 2:
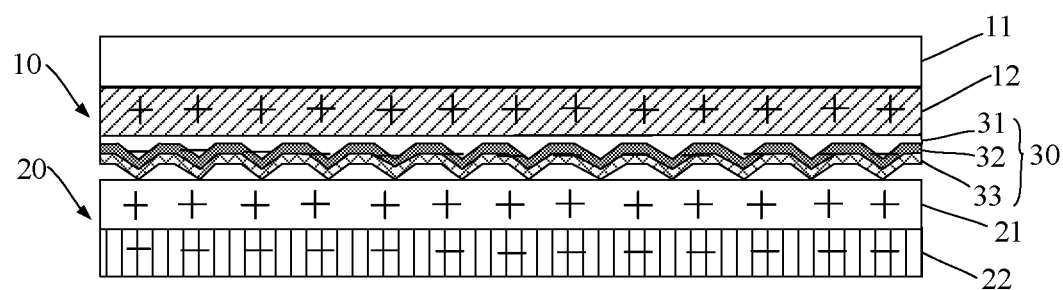
FIG. 2 is a schematic view showing an electricity generation principle of the frictional electric generator according to the first embodiment of the present disclosure.

Referring to FIG. 2 which shows an electricity generation principle of the frictional electric generator according to the first embodiment of the present disclosure, when friction occurs between the composite layer 30 of the first frictional unit 10 and the second insulation substrate 21 of the second frictional unit 20, negative charges may be generated at the composite layer 30, and positive charges at a same quantity may be generated at the second insulation substrate 21. According to the principle of energy conservation, the first output electrode 12 connected to the composite layer 30 is positively charged, while the second output electrode 22 connected to the second insulation substrate 21 is negatively charged. At this time, a potential difference is generated between the first output electrode 12 and the second output electrode 22, so a current may be generated. In addition, the first output electrode 12 and the second output electrode 22 may form a capacitor, and the conductive layer 32 of the composite layer 30 may form a capacitor with the first output electrode 12.

In practice, in some other embodiments of the present disclosure, the positive charges may be generated at the composite layer 30 and the negative charges may be generated at the second insulation substrate 21, depending on materials of the second insulation layer 33 of the composite layer 30 and the second insulation substrate 21.

Figure 3:
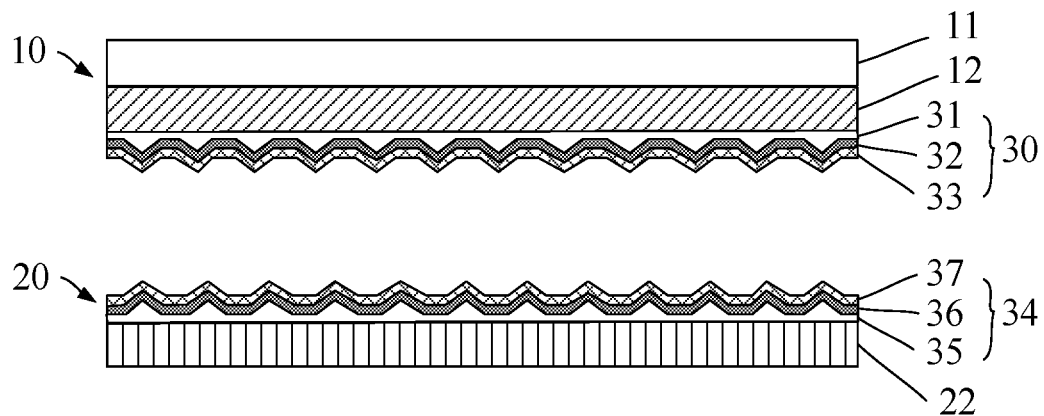
FIG. 3 is a schematic view showing a frictional electric generator according to a second embodiment of the present disclosure.

Referring to FIG. 3 which is a schematic view showing a frictional electric generator according to a second embodiment of the present disclosure, the frictional electric generator includes a first frictional unit 10 and a second frictional unit 20 arranged opposite to each other. The first frictional unit 10 includes a first insulation substrate 11, a first output electrode 12 and a composite layer 30, and the second frictional unit 20 includes a second output electrode 22 and a composite layer 34. Each of the two composite layers is provided with a surface having concave-convex nanostructures, and includes three layers. To be specific, the composite layer 30 includes a first insulation layer 31, a conductive layer 32 and a second insulation layer 33, and the composite layer 34 includes a first insulation layer 35, a conductive layer 36 and a second insulation layer 37. Optionally, an orthogonal projection of each convex point on the frictional surface of the first frictional unit 10 onto the frictional surface overlaps an orthogonal projection of a corresponding convex point on the frictional surface of the second frictional unit 20 onto the frictional surface. In some implementations, the concave-convex structures on the frictional surface of the first frictional unit 10 and the concave-convex structures on the frictional surface of the second frictional unit 20 are in mirror symmetry. The composite layer 30 and the composite layer 34 may be in mirror symmetry relative to a plane which is between the frictional surface of the first frictional unit 10 and the frictional surface of the second frictional unit 20 and is parallel to the frictional surfaces.

In an embodiment of the present disclosure, the first output electrode 12 and the second output electrode 22 may serve as two output electrodes of the frictional electric generator. The two composite layers may serve as two frictional layers of the frictional electric generator, and they may be in contact with each other generate electricity from friction during frictional electric generation.

According to the embodiments of the present disclosure, the composite layer with the surface having the concave-convex nanostructures is formed in each of the first frictional unit 10 and the second frictional unit 20 as the frictional layer. In this way, roughness of the frictional surface of each frictional unit is increased and a charge transfer density of the frictional electric generator is increased, thereby increasing the energy output efficiency of the frictional electric generator. In addition, since the conductive layer 32 of the composite layer 30 of the first frictional unit 10 is capable of forming a capacitor with the first output electrode 12, and the conductive layer 36 of the composite layer 34 of the second frictional unit 20 is capable of forming a capacitor with the second output electrode 22, the formed capacitors are able to improve the sensitivity of a pressure sensor when the frictional electric generator is applied to the capacitive pressure sensor.

In an embodiment of the present disclosure, the layers of the composite layer 30 of the first frictional unit 10 may be made of material different from that of the corresponding layers of the composite layer 34 of the second frictional unit 20. For example, the second insulation layer 33 of the composite layer 30 of the first frictional unit 10 may be made of material different from that of the second insulation layer 37 of the composite layer 34 of the second frictional unit 20. In the embodiments of the present disclosure, same reference numerals are merely used to indicate the layers and positions, and are not used to mean that elements represented by the same reference numerals are made of same material and have a same thickness.

Figure 4:
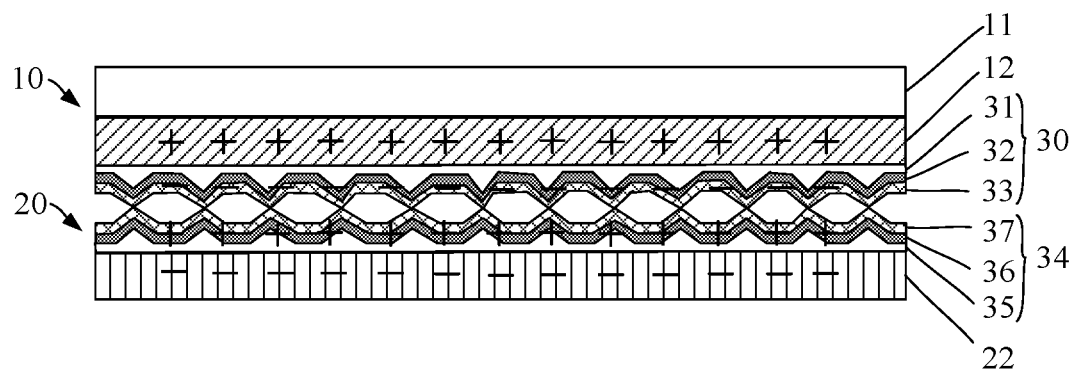
FIG. 4 is a schematic view showing an electricity generation principle of the frictional electric generator according to the second embodiment of the present disclosure.

Referring to FIG. 4 which shows an electricity generation principle of the frictional electric generator according to the second embodiment of the present disclosure, when friction occurs between the composite layer 30 of the first frictional unit 10 and the composite layer 34 of the second frictional unit 20, negative charges may be generated at the composite layer 30, and positive charges at a same quantity may be generated at the composite layer 34. According to the principle of energy conservation, the first output electrode 12 connected to the composite layer 30 is positively charged, while the second output electrode 22 connected to the composite layer 34 is negatively charged. At this time, a potential difference is generated between the first output electrode 12 and the second output electrode 22, so a current may be generated. In addition, the first output electrode 12 and the second output electrode 22 may form a capacitor, the conductive layer 36 of the composite layer 30 of the first frictional unit 10 may form a capacitor with the first output electrode 12, and the conductive layer 36 of the composite layer 34 of the second frictional unit 20 may form a capacitor with the second output electrode 22.

In the first embodiment and second embodiment, the composite layer including three layers is described as an example. In some other embodiments of the present disclosure, the composite layer may include more than three layers, and there is more than one conductive layer in the composite layer. In addition, the number of the layers of the composite layer on one frictional unit may be different from that of the other frictional unit.

In an embodiment of the present disclosure, the conductive layer of the composite layer may be made of any conductive material. When the frictional electric generator according to the embodiments of the present disclosure is applied to a flexible product, preferably, the conductive layer of the composite layer may be a conductive polymer layer, i.e., the composite layer is made of conductive polymer material. For example, the conductive polymer material may be PEDOT (poly 3,4-ethylenedioxythiophene), or a mixture containing PEDOT such as PEDOT-polystyrene sulfonate (PEDOT-PSS). After the addition of PSS, the solubility of PEDOT is significantly increased.

In the embodiments of the present disclosure, the insulation layer of the composite layer may be made of any insulation material. When the frictional electric generator according to the embodiments of the present disclosure is applied to a flexible product, preferably, the insulation layer of the composite layer may be made of flexible insulation material, e.g., an insulation polymer material such as PDMS (polydimethylsiloxane) or parylene.

In the embodiments of the present disclosure, the first output electrode and the second output electrode each may be made of any conductive material. When the frictional electric generator according to the embodiments of the present disclosure is applied to a flexible product, preferably, at least one of the first output electrode or the second output electrode may be made of flexible conductive material, e.g., graphene or carbon nanotube. When at least one of the first output electrode or the second output electrode is made of graphene, a single layer of graphene or multiple layers of graphene may be adopted.

When the frictional electric generator according to the embodiments of the present disclosure is applied to a pressure sensor, preferably, the output electrode as the fixed electrode may be made of conductive material having a sheet resistance in a planar state smaller than a sheet resistance in a curved state, e.g., ITO.

The present disclosure further provides in some embodiments a pressure sensor including the frictional electric generator according to any of the above embodiments of the present disclosure. The first output electrode of the frictional electric generator is reused as a movable electrode of the pressure sensor, and the second output electrode thereof is reused as a fixed electrode of the pressure sensor. The first output electrode is made of flexible conductive material.

In the pressure sensor according to an embodiment of the present disclosure, a spacer needs to be provided between the first frictional unit and the second frictional unit, so as to provide, between the first frictional unit and the second frictional unit, a chamber for the deformation of the first frictional unit.

According to the embodiments of the present disclosure, the two output electrodes of the frictional electric generator are reused as the movable electrode and the fixed electrode of the pressure sensor respectively. When the first frictional unit where the movable electrode is located is pressed, the first frictional unit moves close to the second frictional unit where the fixed electrode is located. At this time, a current is generated due to the friction between the first frictional unit and the second frictional unit. As a result, it is able for the pressure sensor to operate in a power-saving and environment-friendly manner without any additional power source. In addition, the movable electrode and the fixed electrode form a capacitor, and a distance between the movable electrode and the fixed electrode is determined in accordance with a size of a current from the capacitor, so it is able to determine a size of a pressure and achieve a corresponding touch function in accordance with the size of the pressure. Moreover, since the composite layer includes the conductive layer, and the conductive layer o is capable of forming a capacitor with the output electrode, the formed capacitor can improve the sensitivity of the pressure sensor.

Figure 5:
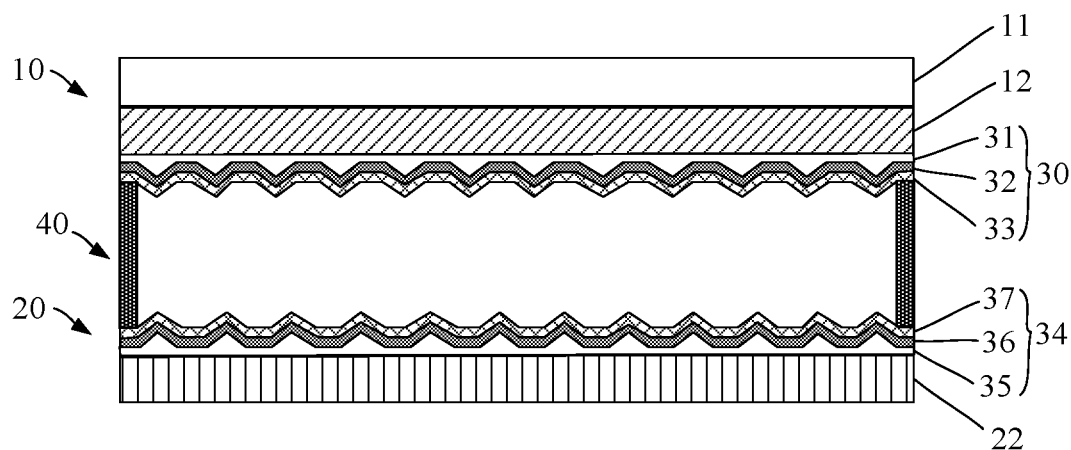
FIG. 5 is a schematic view showing a pressure sensor according to a third embodiment of the present disclosure.

Referring to FIG. 5 which is a schematic view showing a pressure sensor according to a third embodiment of the present disclosure, the pressure sensor includes the first frictional unit 10, the second frictional unit 20 and a spacer 40 arranged between the first frictional unit 10 and the second frictional unit 20. Due to the spacer 40, a chamber for the deformation of the first frictional unit 10 is formed between the first frictional unit 10 and the second frictional unit 20. The first frictional unit 10 includes the first insulation substrate 11, the first output electrode 12 and the composite layer 30, and the second frictional unit 20 includes the second output electrode 22 and the composite layer 34. Each of the two composite layers is provided with a surface having concave-convex nanostructures, and includes three layers. The composite layer 30 includes the first insulation layer 31, the conductive layer 32 and the second insulation layer 33, and the composite layer 34 includes the first insulation layer 35, the conductive layer 36 and the second insulation layer 37.

In the embodiments of the present disclosure, after the first frictional unit 10 is pressed, the first frictional unit 10 may move close to the second frictional unit 20, so friction may occur between the composite layer 30 of the first frictional unit 10 and the composite layer 34 of the second frictional unit 20. At this time, negative charges (or positive charges in some other embodiments of the present disclosure) may be generated at the composite layer 30 of the first frictional unit 10, while positive charges (or negative charges in some other embodiments of the present disclosure) at a same quantity may be generated at the composite layer 34 of the second frictional unit 20. According to the principle of energy conservation, the first output electrode 12 connected to the composite layer 30 is positively charged, while the second output electrode 22 connected to the composite layer 34 is negatively charged. At this time, a potential difference is generated between the first output electrode 12 and the second output electrode 22, so a current may be generated. A distance between the first output electrode 12 and the second output electrode 22 may be determined in accordance with a size of the current, a size of the pressure is determined, and a corresponding touch function is achieved in accordance with the size of the pressure.

The present disclosure further provides in some embodiments a touch substrate including the pressure sensor according to any of the above embodiments of the present disclosure.

According to the embodiments of the present disclosure, the pressure sensor in the touch substrate is capable of being self-powered, so it is able for the pressure sensor to operate in a power-saving and environment-friendly manner without any additional power source. In addition, due to the high sensitivity of the pressure sensor, touch control with high sensitivity can be achieved.

Preferably, the touch substrate according to an embodiment of the present disclosure is a touch display substrate.

The present disclosure further provides in some embodiments a touch device including the above-mentioned touch substrate, and a control unit connected to the touch substrate and configured to receive a current from the pressure sensor and perform touch control in accordance with a size of the current.

According to the embodiments of the present disclosure, the pressure sensor is capable of being self-powered, so it is able for the pressure sensor to operate in a power-saving and environment-friendly manner without any additional power source provided in the touch device. In addition, a volume of the touch device may be reduced, thereby providing a lighter and thinner touch device. Moreover, due to the high sensitivity of the pressure sensor, a more accurate touch result is provided, improving the user experience.

In some possible embodiments of the present disclosure, a correspondence between the size of the current and the size of the pressure may be stored in the control unit. Upon the receipt of the current, the size of the pressure corresponding to the received current is acquired based on the stored correspondence, and a corresponding touch function is achieved in accordance with the size of the pressure.

In some possible embodiments of the present disclosure, a correspondence between the current and touch functions may also be directly stored in the control unit. Upon the receipt of the current, the touch function corresponding to the received current is obtained by query, achieving touch control directly.

The present disclosure further provides in some embodiments a flexible wearable device including the pressure sensor according to the above embodiments of the present disclosure. At least one of the first output electrode or the second output electrode is made of flexible conductive material.

Preferably, the first output electrode, the second output electrode and the composite layer each may be made of flexible material.

The flexible wearable device may be applied to a health and medical field. For example, the flexible wearable device may be a device for monitoring human health in real time, e.g., monitoring parameters such as pulse and heart rate. The pressure sensor is capable of being self-powered, so it is able for the pressure sensor to operate in a power-saving and environment-friendly manner without any additional power source provided in the wearable device. In addition, a volume of the wearable device may be reduced. Moreover, due to the high sensitivity of the pressure sensor, a more accurate monitoring result is provided, improving the user experience.

The present disclosure further provides in some embodiments a method for manufacturing a frictional electric generator, including forming a first frictional unit and a second frictional unit arranged opposite to each other, where the first frictional unit includes a first output electrode, the second frictional unit includes a second output electrode, and a composite layer is formed in at least one of the first frictional unit or the second frictional unit. The composite layer is provided with a surface having concave-convex nanostructures, it includes at least three layers. Among the at least three layers, two layers at both sides are insulation layers, and at least one of layers between the two insulation layers is a conductive layer.

According to the frictional electric generator manufactured by the method in the embodiments of the present disclosure, the composite layer with the surface having the concave-convex nanostructures is formed on at least one frictional unit of the frictional electric generator and serves as a frictional layer. In this way, roughness of the frictional surface of the frictional unit is increased and a charge transfer density of the frictional electric generator is increased, increasing the energy output efficiency thereof. In addition, the composite layer includes the conductive layer, and the conductive layer is capable of forming a capacitor with the output electrodes, it is able to improve the sensitivity of a pressure sensor when the frictional electric generator is applied to the capacitive pressure sensor.

In a possible embodiment of the present disclosure, a surface of the composite layer is provided with multiple nanoscale convex points, so as to form concave-convex nanostructures.

Optionally, the multiple convex points are arranged in a matrix form. Each convex point may be of a semicircular, nearly-semicircular, conical or drop-like shape.

Optionally, the first frictional unit may further include a first insulation substrate carrying thereon the first output electrode, and/or the second frictional unit may further include a second insulation substrate carrying thereon the second output electrode. When the frictional electric generator according to the embodiments of the present disclosure is applied to a flexible product, at least one of the first insulation substrate or the second insulation substrate may be made of flexible insulation material, e.g., PET (polyethylene terephthalate).

In some preferred embodiments of the present disclosure, forming the composite layer may include: step 101 of providing a template, a surface of the template being provided with multiple nanoscale holes; step 102 of forming a first insulation layer of the composite layer on the surface of the template; step 103 of removing the first insulation layer from the template, a surface of the first insulation layer having concave-convex nanostructures; and step 104 of forming other layers of the at least three layers of the composite layer sequentially on the surface of the first insulation layer having the concave-convex nanostructures.

In some other embodiments of the present disclosure, forming the composite layer may include: step 301 of providing a template, a surface of the template being provided with multiple nanoscale concaves; step 302 of forming the at least three layers of the composite layer sequentially on the surface of the template; and step 303 of removing the composite layer from the template.

The method for manufacturing the frictional electric generator according to the embodiments of the present disclosure will be described hereinafter in conjunction with examples.

In a fourth embodiment of the present disclosure, the method for manufacturing the frictional electric generator may include the following steps.

In step 301, a silicon template may be provided, and a surface of the silicon template may have multiple nanoscale concaves (e.g., each concave has at least one of a nanoscale depth or a nanoscale diameter). Next, a PDMS layer may be formed on a surface of the silicon template, as the above-mentioned first insulation layer.

In step 302, the PDMS layer may be removed from the silicon template. A surface of the PDMS layer has concave-convex nanostructures.

In step 303, a layer of PEDOT-PSS may be formed on the surface of the PDMS layer having the concave-convex nanostructures through spinning process, to form a PEDOT layer, as the above-mentioned conductive layer.

In step 304, parylene may be deposited onto a surface of the PEDOT layer, to form a parylene layer, as the above-mentioned second insulation layer. The PDMS layer, the PEDOT layer and the parylene layer together form the composite layer.

In the embodiment of the present disclosure, the composite layer is provided with a surface having concave-convex nanostructures, and the concave-convex nanostructures include multiple convex points arranged in a matrix form. The composite layer is manufactured through the above steps.

In step 305, a copper foil may be provided, and a single layer of graphene may be deposited onto the copper foil, so as to acquire a single-layered graphene electrode as the above-mentioned first output electrode.

In the embodiment, the copper foil serves as a substrate. Apart from the copper foil, other metal substrate may be adopted.

In step 306, the copper foil may be etched off through a wet-etching process to reserve the single-layered graphene electrode, and the single-layered graphene electrode may be transferred onto a PET film as the above-mentioned first insulation substrate.

In step 307, the composite layer acquired through steps 301 to 304 may be attached to the surface of the single-layered graphene electrode, so as to form the first frictional unit.

In step 308, a PET film may be provided as the above-mentioned second insulation substrate, and an ITO film may be plated onto the PET film so as to form an ITO electrode as the above-mentioned second output electrode. The PET film and the ITO electrode together form the second frictional unit.

In step 309, the first frictional unit may be attached to the second frictional unit, and a spacer may be provided between the first frictional unit and the second frictional unit, so as to provide a chamber for the deformation of the first frictional unit. The spacer may be made of viscous material such as sealant.

In a fifth embodiment of the present disclosure, the method for manufacturing the frictional electric generator may include the following steps.

In step 401, two composite layers may be formed through the above steps 301 to 304.

In step 402, a copper foil may be provided, and a single layer of graphene may be deposited onto the copper coil so as to form a single-layered graphene electrode as the above-mentioned first output electrode. In the embodiment of the present disclosure, the copper foil serves as a carrier substrate, and apart from the copper foil, other metal substrate may be adopted.

In step 403, the copper foil may be etched off through a wet-etching process so as to reserve the single-layered graphene electrode, and then the single-layered graphene electrode may be transferred onto a PET film as the above-mentioned first insulation substrate.

In step 404, one of the composite layers may be attached onto a surface of the single-layered graphene electrode so as to form the first frictional unit. During the attachment, a surface of the composite layer not having the concave-convex nanostructures may be attached onto the single-layered graphene electrode.

In step 405, an ITO film may be plated onto a surface of the other composite layer not having the concave-convex nanostructures, so as to form an ITO electrode as the above-mentioned second output electrode. The composite layer and the ITO electrode together form the second frictional unit.

In step 406, the first frictional unit may be attached to the second frictional unit, and a spacer may be provided between the first frictional unit and the second frictional unit so as to provide a chamber for the deformation of the first frictional unit. The spacer may be made of viscous material such as a sealant.

The frictional electric generator in the fourth embodiment and the fifth embodiment may be applied to a pressure sensor. The first output electrode is made of single-layered graphene, so it has excellent flexibility. When the first output electrode is bent, its sheet resistance may not change significantly, so the first output electrode may serve as the movable electrode of the pressure sensor. The second output electrode is made of ITO, and the ITO electrode has a relatively low sheet resistance in a planar state, so the second output electrode may serve as the fixed electrode of the pressure sensor. When the second output electrode is pressed, it may not be deformed, so its sheet resistance may substantially remain unchanged. As a result, defects occurring in a case where the pressure sensor merely adopts the ITO electrodes or the graphene electrodes are effectively prevented.

Unless otherwise defined, any technical or scientific term used herein shall have the common meaning understood by a person of ordinary skills. Such words as "first" and "second" used in the present disclosure are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on", "under", "left" and "right" are merely used to represent relative position relationship, and when an absolute position of the object is changed, the relative position relationship will be changed too.

The above are merely some embodiments of the present disclosure. It should be noted that, a person skilled in the art may make further modifications and improvements without departing from the principle of the present disclosure, and these modifications and improvements shall also fall within the scope of the present disclosure.

What is claimed is:

1. A frictional electric generator, comprising a first frictional unit and a second frictional unit arranged opposite to each other, wherein the first frictional unit comprises a first output electrode, the second frictional unit comprises a second output electrode, a composite layer is arranged in at least one of the first frictional unit or the second frictional unit, the composite layer is provided with a surface having concave-convex nanostructures as a frictional surface, and the first output electrode and the second output electrode are configured to form a capacitor; wherein the first output electrode is made of graphene or carbon nanotube, and the second output electrode is made of indium tin oxide (ITO);
wherein the composite layer in one of the first frictional unit and the second frictional unit comprises, in a direction facing the other of the first frictional unit and the second frictional unit, a first insulation layer, at least one conductive layer and a second insulation layer in sequence; a surface of the second insulation layer has the concave-convex nanostructures and serves as the frictional surface, and the surface of the second insulation layer faces the other of the first frictional unit and the second frictional unit and the conductive layer and at least one of the first output electrode or the second output electrode are configured to form a capacitor;
wherein the first insulation layer is a polydimethylsiloxane (PDMS) layer, the conductive layer is a poly 3,4-ethylenedioxythiophene (PEDOT) layer, and the second insulation layer is a parylene layer.

2. The frictional electric generator according to claim 1, wherein the second insulation layer is of a concave-convex structure having a nanoscale thickness.

3. The frictional electric generator according to claim 1, wherein when each of the first frictional unit and the second frictional unit is provided with the composite layer, an orthogonal projection of a convex point on the frictional surface of the first frictional unit onto the frictional surface overlaps an orthogonal projection of a convex point on the frictional surface of the second frictional unit onto the frictional surface.

4. The frictional electric generator according to claim 3, wherein the composite layer of the first frictional unit and the composite layer of the second frictional unit are mirror symmetric relative to a plane which is between the frictional surface of the first frictional unit and the frictional surface of the second frictional unit and is parallel to the frictional surfaces.

5. The frictional electric generator according to claim 1, wherein the frictional surface is provided with a plurality of convex points arranged in an array form, and each of the plurality of convex points has at least one of a nanoscale height or a nanoscale diameter.

6. The frictional electric generator according to claim 1, wherein the first frictional unit comprises, in a direction facing the second frictional unit, a first insulation substrate, the first output electrode and the composite layer in sequence, the first insulation substrate is made of polyethylene terephthalate (PET); and
wherein the second frictional unit comprises a second insulation substrate and the second output electrode, the second output electrode is arranged at a side of the second insulation substrate away from the first frictional unit, the second insulation substrate is made of PET.

7. The frictional electric generator according to claim 1, wherein the first frictional unit comprises, in a direction facing the second frictional unit, a first insulation substrate, the first output electrode, and the composite layer in sequence, the first insulation substrate is made of PET; and
wherein the second frictional unit comprises the second output electrode and the composite layer arranged at a side of the second output electrode facing the first frictional unit.

8. A pressure sensor, comprising the frictional electric generator according to claim 1, wherein the first output electrode of the frictional electric generator is reused as a movable electrode of the pressure sensor, the second output electrode is reused as a fixed electrode of the pressure sensor.

9. A touch substrate, comprising the pressure sensor according to claim 8.

10. A touch device, comprising the touch substrate according to claim 9, and a control unit connected to the touch substrate and configured to receive a current from the pressure sensor and perform touch control based on a size of the current.

11. A flexible wearable device, comprising the pressure sensor according to claim 8.

12. A method for manufacturing a frictional electric generator, comprising forming a first frictional unit and a second frictional unit arranged opposite to each other, wherein the first frictional unit comprises a first output electrode, the second frictional unit comprises a second output electrode, a composite layer is formed in at least one of the first frictional unit or the second frictional unit, the composite layer is provided with a surface having concave-convex nanostructures as a frictional surface, and the first output electrode and the second output electrode are configured to form a capacitor; wherein the first output electrode is made of graphene or carbon nanotube, and the second output electrode is made of indium tin oxide (ITO);
wherein forming the composite layer comprises: providing a template, a surface of the template being provided with a plurality of nanoscale holes; forming a first insulation layer on the surface of the template; removing the first insulation layer from the template, wherein a surface of the first insulation layer has concave-convex nanostructures; and forming at least one conductive layer and a second insulation layer sequentially on the surface of the first insulation layer having the concave-convex nanostructures, wherein the composite layer comprises the first insulation layer, the at least one conductive layer and the second insulation layer;

or, wherein the forming the first frictional unit comprises: providing a copper foil, and depositing a single layer of graphene on the copper foil to form the first output electrode; etching away the copper foil through a wet-etching process to reserve the first output electrode, and transferring the first output electrode to a first insulation substrate made of PET; and attaching the composite layer to a surface of the first output electrode to form the first frictional unit and the forming the second frictional unit comprises: providing a second insulation substrate made of PET; and plating an ITO film onto the second insulation substrate to form the second output electrode, wherein the second frictional unit comprises the second insulation substrate and the second output electrode;

or, wherein the forming the first frictional unit comprises: providing a copper foil, and depositing a single layer of graphene on the copper foil to form the first output electrode; etching away the copper foil through a wet-etching process to reserve the first output electrode, and transferring the first output electrode to a first insulation substrate made of PET; and attaching one formed composite layer to a surface of the first output electrode to form the first frictional unit and wherein the forming the second frictional unit comprises plating an ITO film onto a surface of another formed composite layer not having the concave-convex nanostructures, to form the second output electrode, wherein the second frictional unit comprises the another composite layer and the second output electrode.

\* \* \* \* \*